United States Patent
Fries et al.

(10) Patent No.: US 6,265,481 B1
(45) Date of Patent: Jul. 24, 2001

(54) RAPIDLY ABSORBED PRINTING INKS AND THEIR USE

(75) Inventors: Werner Fries, Weil der Stadt; Karl-Wilhelm Klemm, Stuttgart; Arnold Dobbelstein; Horst Sobitzkat, both of Münster, all of (DE)

(73) Assignee: BASF Lacke & Farben Aktiengesellschaft (DE)

( * ) Notice: Subject to any disclaimer, the term of this patent is extended or adjusted under 35 U.S.C. 154(b) by 0 days.

(21) Appl. No.: 08/484,047

(22) Filed: Jun. 7, 1995

Related U.S. Application Data

(63) Continuation of application No. 08/270,100, filed on Jul. 1, 1994, which is a continuation of application No. 08/104,949, filed on Aug. 10, 1993, now abandoned, which is a continuation of application No. 07/955,398, filed on Oct. 1, 1992, now abandoned, which is a continuation of application No. 07/787,697, filed on Nov. 1, 1991, now abandoned, which is a continuation of application No. 07/657,336, filed on Feb. 14, 1991, now abandoned, which is a continuation of application No. 07/333,842, filed on Apr. 3, 1989, now abandoned, which is a continuation-in-part of application No. 07/183,466, filed on Apr. 15, 1988, now abandoned, which is a continuation of application No. 07/039,802, filed on Apr. 15, 1987, now abandoned, which is a continuation of application No. 06/878,836, filed on Apr. 30, 1986, now abandoned.

(30) Foreign Application Priority Data

Sep. 1, 1984 (DE) .................................................. 3432234
Aug. 16, 1985 (WO) .................................. PCT/DE85/00277

(51) Int. Cl.[7] .............................. C08K 5/13; C09D 11/00

(52) U.S. Cl. ........................ 524/594; 525/54.42; 527/602; 523/161; 106/31.34; 106/31.35

(58) Field of Search ........................... 524/594; 106/23 E, 106/27 R, 28 R, 29 R, 31.34, 31.35; 525/54.42; 527/602; 523/161

(56) References Cited

U.S. PATENT DOCUMENTS

| | | | |
|---|---|---|---|
| 3,772,171 | * 11/1973 | Savageau et al. | 427/511 |
| 4,139,500 | * 2/1979 | Ruldolphy | 525/54.44 |
| 4,148,767 | * 4/1979 | Spicer et al. | 524/267 |
| 4,383,860 | * 5/1983 | Uhlemayr et al. | 106/27 R |

\* cited by examiner

Primary Examiner—Terrel Morris
Assistant Examiner—John J. Guarriello
(74) Attorney, Agent, or Firm—Kenyon & Kenyon

(57) ABSTRACT

The invention relates to a printing ink which consists of pigments, an alkyd resin binder modified with fatty acids having an iodine number from 120 to 280 (g of $I_2$/100 g), a phenolic resin-modified rosin binder and, if appropriate, further binders and further conventional constituents, such as lubricants, solvents, thickeners and thixotropic agents. The alkyd resin binder and the phenolic resin-modified rosin binder are present in proportions from 10 to 40% by weight and 60 to 90% by weight respectively, their sum giving 100% by weight. The alkyd resin has an acid number of Less than 11 and a hydroxyl number from 40 to 260 and has been prepared by reacting a) an unsaturated fatty acid having 6 to 20 carbon atoms or a mixture of such acids or their triglycerides with b) a polyol and c) a dicarboxylic acid.

5 Claims, No Drawings

RAPIDLY ABSORBED PRINTING INKS AND THEIR USE

This application is a Continuation of Ser. No. 08/270,100, filed Jul. 1, 1994, which is a Continuation of Ser. No. 08/104,949, filed Aug. 10, 1993, now abandoned; which is a Continuation of Ser. No. 07/955,398 filed Oct. 1, 1992, now abandoned; which is a Continuation of Ser. No. 07/787,697 filed Nov. 1, 1991, now abandoned; which is a Continuation of Ser. No. 07/657,336 filed Feb. 14, 1991, now abandoned; which is a Continuation of Ser. No. 07/333,842 filed Apr. 3, 1989, now abandoned; which is a Continuation-in-Part Ser. No. 07/183,466 filed Apr. 15, 1988, now abandoned; which is a Continuation of Ser. No. 07/039,802 filed Apr. 15, 1987, now abandoned; which is a Continuation of Ser. No. 06/878,836 filed Apr. 30, 1986, now abandoned.

The invention relates to printing inks which contain, as the binder, phenolic resin-modified rosin in a proportion of 60 to 90% by weight and an alkyd resin in a proportion of 10 to 40% by weight, the sum of phenolic resin-modified rosin and alkyd resin giving 100% by weight. The alkyd resin has been prepared from a) an unsaturated fatty acid having 6 to 12 carbon atoms or a mixture of such acids or their triglycerides, b) a polyol and c) a dicarboxylic acid.

The printing inks also contain pigments, if appropriate further binders and further conventional constituents, such as lubricants, solvents, thickeners and thixotropic agents.

German Patent Specification 3,023,118 has disclosed paper printing inks of this type for graphical purposes. These consist of pigments, an alkyd resin binder which has been modified by long-chain fatty acids having an iodine number of less than 20 (determined according to DIN 53,241) and which has an acid number of preferably 6 to 12 and an hydroxyl number of preferably greater than 15 (determined according to DIN 53,241), in particular from 20 to 35, and, if appropriate, further conventional constituents, such as lubricants, solvents and a viscosity control agent.

Depending on the field of application, printing inks must meet a large number of requirements. For example, printing inks should have a high abrasion resistance and, in many cases, good re-release properties. As far as possible, they should also be free from yellowing, have a neutral odor and be fast-drying. To prepare the printing ink, the various resins are first dissolved at an elevated temperature in mineral oil, and the pigments are then introduced. Subsequently, the printing inks of the composition described above cure by oxidation.

When the printing inks described in German Patent Specification 3,023,118 and also other printing inks are used for sheet-fed offset printing, the problem of setting off arises, i.e. printing inks which are well compatible with mineral oil release the latter only slowly, and consequently the prints remain wet and therefore require powdering. The powder serves as a spacer for the wet prints and also allows better access of oxygen for the oxidative drying. However, powdering has an adverse effect on the quality of the prints and the further processing steps.

The disadvantages of powdering comprise poor abrasion resistance of the prints, complications in downstream processes, such as varnishing and cellophaning, and contamination of the machine.

A review of the disadvantages of powdering in offset printing is given by W. Walenski in "Der Polygraph", volume 5, 1984, pages 435–36. This review demonstrates the urgency of the demand for a rapidly absorbed printing ink.

The object of the invention is therefore to avoid these disadvantages of the state of the art and to provide a printing ink which is rapidly absorbed and therefore does not require powdering.

Surprisingly, it has been found that this object is achieved by a printing ink which, as the binder, contains an alkyd resin having a high hydroxyl number, a low acid number and a high iodine number of the fatty acids, in combination with a phenol resin-modified rosin. The invention therefore relates to a printing ink of the type described at the outset, wherein the unsaturated fatty acids have an iodine number of 120 to 190 [g of $I_2$/100 g] and the alkyd resin has an acid number of less than 11 and a hydroxyl number of 40 to 260 [mg of KOH/g of resin].

In contrast to German Patent Specification 3,023,118, a type of fast-drying oils or fatty acids, which are distinguished by a high iodine number, are used for modifying the alkyd resin. The oxidative drying via the double bonds of the highly unsaturated fatty acids or oils is responsible for the chemical drying of the printing ink. Good chemical drying is supplemented by physical drying of the printing ink, which can be determined by the absorption properties. Good physical drying is obtained by the printing ink according to the invention. The alkyd resins used as the binders have hydroxyl numbers which are in the range from 40 to 260. These hydroxyl numbers, which are high in comparison with German Patent Specification 3,023,118, cause an increased polarity of the alkyd resin binders. These polar alkyd resins have only a limited solubility in mineral oils, which has the result that printing inks containing polar alkyd resins and mineral oil show good absorption. Hydroxyl numbers of at least 40 are necessary in order to obtain the polarity required for rapid absorption; the OH number range from 110 to 180 can be indicated as particularly advantageous for the absorption properties. If an alkyd resin OH number of 260 is exceeded, the polar alkyd resin is then hardly soluble in the mineral oil which is the conventional solvent for printing inks.

Refined linseed oil, soya oil or dehydrated castor oil have proved suitable as the unsaturated fatty acids or oils. Trimethylolpropane, glycerol and/or pentaerythritol are particularly suitable as the polyol components. The preferred dicarboxylic acids are phthalic acid, isophthalic acid, adipic acid or tetrahydrophthalic acid, their anhydrides being employed in practice, where these exist.

The invention also relates to a process for preparing a printing ink.

A fatty acid-modified alkyd resin is first prepared from a) an unsaturated fatty acid having 6 to 20 carbon atoms or a mixture of such acids or their triglycerides, b) a polyol and c) a dicarboxlyic acid.

This resin is combined with phenolic resin-modified rosin and a mineral oil to give a binder mixture, the proportion of alkyd resin being 10 to 40% by weight and that of the modified rosin being 60 to 90% by weight, based on the total weight of alkyd resin and rosin. This binder mixture is dispersed, together with pigments, if appropriate further binders and further conventional constituents, such as lubricants, thickeners and thixotropic agents, by means of a dispersing device, for example a three-roll mill, a sand mill or a ball mill. The distinctive feature here is that the unsaturated fatty acids have an iodine number from 120 to 190 and the alkyd resins have a hydroxyl number from 40 to 260 and an acid number of less than 11.

Refined linseed oil, soya oil or dehydrated castor oil can advantageously be used for modifying the alkyd resins.

Suitable polyol components are trimethylolpropane, glycerol and/or pentaerythritol, and phthalic acid, isophthalic acid, adipic acid or tetrahydrophthalic acid or their anhydrides, where these exist, can be used as the dicarboxylic acid component.

The printing inks according to the invention can be used for the sheet-fed offset printing process, in which the print is set down first on a rubber blanket and from the latter to the paper or another printing substrate. In the sheet-fed offset printing process, cut sheets are printed.

Since the printing inks according to the invention also show good physical drying, in addition to the oxidative drying, in other words are rapidly absorbed, the otherwise required powdering can be omitted. This is a great advantage, since the powder adversely affects the quality of the prints and makes the further processing steps more difficult.

With respect to the printing inks according to the invention, the combination of good chemical and physical drying as the result of suitable iodine numbers and hydroxyl numbers can be regarded as novel and advantageous.

Measurements of the absorption properties show that the printing inks according to the invention are absorbed more rapidly than the printing inks described in German Patent Specification 3,023,118.

The invention is described in more detail below by reference to illustrative examples.

EXAMPLE 1

1,508 parts by weight of linseed oil fatty acid, 523 parts by weight of pentaerythritol and 479 parts by weight of isophthalic acid are heated to 250° C. in a reactor under a slow stream of blanketing gas. This temperature is maintained until the hot mixture is clear. The temperature is then allowed to drop to 210° C., and this temperature is maintained until an acid number of less than 9 has been reached and the viscosity is 60–70 dpa.s (80% in butyldiglycol). The OH number of the resin is 111. The resin obtained is dissolved in a mineral oil having a boiling range from 280 to 310° C., such that a 70% solution is formed.

Using this resin solution, a printing ink binder of the following composition is prepared:

| | |
|---|---|
| Phenolic resin-modified rosin | 300 parts by weight |
| Alkyd resin, 70% in mineral oil | 250 parts by weight |
| Mineral oil, boiling range 280–310° C. | 450 parts by weight |
| | 1000 parts by weight |

The resins are dissolved in mineral oil at 220° C., with stirring. A printing ink of the following composition is prepared with this binder by means of a three-roll mill:

| | |
|---|---|
| Blue pigment | 15 parts by weight |
| Substrates (inorganic fillers, for example CaCO$_3$, Al$_2$O$_3$) | 3 parts by weight |
| Wax | 1 part by weight |
| Binder | 72 parts by weight |
| Mineral oil | 7 parts by weight |
| Drier | 2 parts by weight |
| | 100 parts by weight |

EXAMPLE 2

1,073 parts by weight of refined linseed oil are heated to 200° C. in a reactor under a slow stream of blanketing gas. 418 parts by weight of pentaerythritol and 2 parts by weight of lithium stearate are then added and the mixture is heated to 260° C. Transesterification takes place at this temperature. The mixture is then cooled to 210° C. and 534 parts by weight of isophthalic acid are added. The mixture is then reheated to 240° C. and this temperature is maintained until the hot mixture is clear. The temperature is then allowed to drop to 200° C. and maintained there, until an acid number of less than 11 is reached and the viscosity is 300–400 dPa.s (80% in butyldiglycol). The OH number of the resin is 181. The resin obtained is dissolved in a mineral oil having a boiling range from 280 to 310° C., such that a 60% solution is formed.

Using this resin solution, a printing ink binder of the following composition is prepared:

| | |
|---|---|
| Phenolic resin-modified rosin | 300 parts by weight |
| Alkyd resin, 60% in mineral oil | 250 parts by weight |
| Mineral oil, boiling range 280–310° C. | 450 parts by weight |
| | 1000 parts by weight |

The resins are dissolved in the mineral oil at 220° C., with stirring. A printing ink of the following composition is prepared with this binder by means of a three-roll mill:

| | |
|---|---|
| Blue pigment | 15 parts by weight |
| Substrates (inorganic fillers) | 3 parts by weight |
| Wax | 1 part by weight |
| Binder | 70 parts by weight |
| Mineral oil | 9 parts by weight |
| Drier | 2 parts by weight |
| | 100 parts by weight |

Comparative Example

For comparison purposes, the printing ink according to example 1 of German Patent Specification 3,023,118 is prepared. The modified alkyd resin is prepared from 1,800 g of coco nut oil, 569 g of trimethylolpropane and 797 g of isophthalic acid, under the conditions indicated therein with the addition of 0.1 g of lead monoxide and 7 g of p-toluenesulfonic acid as a crosslinking catalyst, and diluted with 600 g of mineral oil (boiling range 250–280° C.). As described in the example, 10 g of the alkyd resin are then pasted with 10 g of a pigment, 2 g of a polyethylene wax and 76 g of a binder solution consisting of 32 g of a phenolic resin-modified rosin resin in 44 g of mineral oil (boiling range 270–310° C.).

The absorption properties of the printing inks prepared in examples 1 and 2 is compared with the absorption properties of the printing ink from the comparative example based on isophthalic acid, coco nut oil and trimethylolpropane.

The absorption properties are measured by a densitometric determination, as a function of time, of the quantity of ink which is transferred from the printed material to a reverse-printing material. It is found here that, in the case of the printing ink described in the comparative example, the optical density on the reverse-printing material after 15 seconds is 8–10 times higher than the optical density obtained when measuring the printing inks from examples 1 and 2. This means that the latter are absorbed 8–10 times more rapidly. After 30 seconds, the absorption of the printing inks according to the invention is still more rapid by a factor of about 4, and the optical densities are of comparable magnitude only after about 60 seconds.

What is claimed is:

1. A printing ink containing as a binder
   A) a phenolic resin-modified rosin in a proportion of 60 to 90% by weight and
   B) an alkyd resin in a proportion of 10 to 40% by weight, the sum of A) and B) giving 100% by weight and the alkyd resin having been prepared from
      a) an unsaturated fatty acid having 6 to 20 carbon atoms or a mixture of such acids or their triglycerides;
      b) a polyol, and
      c) a dicarboxylic acid or anhydride thereof,
   said unsaturated fatty acid having an iodine number of from 120 to 190 (g of $I_2$/100 g) and the alkyd resin having a hydroxyl number of from 40 to 260 (mg KOH/g) of resin and an acid number less than 11.

2. A printing ink as claimed in claim 1, wherein the hydroxyl number of the alkyd resin is 110 to 180.

3. A printing ink as defined in claim 1 wherein the unsaturated fatty acid of the alkyd resin is obtained from refined linseed oil, soya oil or dehydrated castor oil.

4. A printing ink as defined in claim 1 wherein the polyol component b) of the alkyd resin is trimethylolpropane, glycerol or pentaerythritol.

5. A printing ink as described in claim 1 wherein component c) is phthalic acid, isophthalic acid, adipic acid or tetrahydrophthalic acid or an anhydride thereof.

* * * * *